US011614726B2

(12) United States Patent
Siddaraju et al.

(10) Patent No.: US 11,614,726 B2
(45) Date of Patent: Mar. 28, 2023

(54) METHOD AND APPARATUS TO IDENTIFY CONNECTED DEVICE TYPES ON AN I/O CHANNEL BASED ON CURRENT CHARACTERISTICS

(71) Applicant: Honeywell International Inc., Morris Plains, NJ (US)

(72) Inventors: Shivakumar Siddaraju, Karnataka (IN); Adrianus C. M. Hamers, Berkel-Enschot (NE); Harsha Sukeerthi C N, Bengaluru (IN); Debapriya Banerjee, West Bengal (IN)

(73) Assignee: Honeywell International Inc., Charlotte, NC (US)

( * ) Notice: Subject to any disclaimer, the term of this patent is extended or adjusted under 35 U.S.C. 154(b) by 11 days.

(21) Appl. No.: 16/751,893

(22) Filed: Jan. 24, 2020

(65) Prior Publication Data
US 2021/0232113 A1 Jul. 29, 2021

(51) Int. Cl.
*G05B 19/04* (2006.01)
*G05B 19/042* (2006.01)
*G05B 13/04* (2006.01)

(52) U.S. Cl.
CPC ....... *G05B 19/0425* (2013.01); *G05B 13/041* (2013.01); *G05B 2219/1157* (2013.01)

(58) Field of Classification Search
CPC .............. G05B 19/0425; G05B 13/041; G05B 2219/1157
USPC ............................................ 700/296; 706/54
See application file for complete search history.

(56) References Cited

U.S. PATENT DOCUMENTS

| 8,315,831 | B2 | 11/2012 | Siddaraju et al. | |
| 8,392,626 | B2 | 3/2013 | Wormmeester et al. | |
| 8,788,714 | B2 | 7/2014 | Anugu et al. | |
| 9,310,405 | B2* | 4/2016 | Lai | G01R 21/133 |
| 9,892,011 | B2 | 2/2018 | Viswanathan et al. | |
| 10,274,530 | B2 | 4/2019 | Hamers et al. | |
| 10,531,255 | B2 | 1/2020 | Bhagwani et al. | |
| 2010/0191487 | A1* | 7/2010 | Rada | G05F 1/70 702/60 |
| 2010/0305773 | A1* | 12/2010 | Cohen | H04B 3/542 700/296 |
| 2011/0313582 | A1* | 12/2011 | van Megen | G01D 4/00 700/297 |

(Continued)

*Primary Examiner* — Rocio Del Mar Perez-Velez
*Assistant Examiner* — Christopher W Carter
(74) *Attorney, Agent, or Firm* — Ortiz & Lopez, PLLC; Kermit D. Lopez; Luis M. Ortiz

(57) ABSTRACT

A method, system and apparatus for identifying a type of device connected to I/O (Input/Output) channels of an I/O module, can involve applying a current for a predefined time duration to one or more I/O channels of an I/O module, initiating a current readback at a regular interval of time within the predefined time duration, determining values of the current readback for each of a time interval during the predefined time duration, storing the values of the current readback in a memory associated with the I/O module, determining a pattern as a function of the values of the current readback and a sample of time interval for a device connected to the one or more I/O channels, and identifying a type of the device connected to the one or more I/O channels based on a determined pattern of a current sink of the device connected to the one or more I/O channels.

17 Claims, 5 Drawing Sheets

(56) References Cited

U.S. PATENT DOCUMENTS

2012/0072389 A1\* 3/2012 Aldridge ................. G06N 5/04
  706/54
2012/0290261 A1\* 11/2012 Genta ................. F16K 37/0083
  702/179
2018/0198803 A1 7/2018 Pfleger de Aguiar et al.

\* cited by examiner

METHOD AND APPARATUS TO IDENTIFY CONNECTED DEVICE TYPES ON AN I/O CHANNEL BASED ON CURRENT CHARACTERISTICS

TECHNICAL FIELD

Embodiments relate to industrial process control systems. More specifically, embodiments relate to a method, system and apparatus that can identify connected device types on an I/O channel based on current characteristics of connected devices.

BACKGROUND

Industrial process control and automation systems may be used to automate large and complex industrial processes. These types of systems routinely include various components including sensors, actuators, and controllers. Some of the controllers, for example, can receive measurements from sensors and/or connected input/output (I/O) subsystems and generate control signals for associated actuators.

Existing process control and automation systems typically have hardware components participating in control and I/O functions that can be installed in a control room and/or in the field. These systems can be used to gather I/O information from the field, which can be transmitted to a control room. The systems in the control room can perform various control functions and can transmit outputs back to components in the field.

A typical industrial process control system can include a plurality of field devices that can provide several different functional capabilities and are often communicatively coupled to process controllers using wiring connection arrangements or by wireless communications. The different field devices may communicate differently such as in analog mode, digital mode or via analog values with digital communications superimposed on the analog value using, for example, the Highway Addressable Remote Transducer ("HART") communication protocol. Some field devices can use entirely digital communications (e.g., a FOUNDATION Fieldbus communication protocol). Some of the field devices may be "smart" field devices such as an IoT (Internet of Things) device, which can communicate using IoT protocols.

Each field device can be coupled to a process controller via one or more I/O channels and a respective communications medium (e.g., a two-wire cable, a wireless link, or an optical fiber). The number of field devices in an industrial process may be very large. During the initial installation of the complex process, verification may be performed to confirm that the correct devices are connected to associated I/O channels. Therefore, configuring a wrong device may lead to a hazardous situation.

Accordingly, there is a need for detecting smart devices when connected to I/O channels at run time to reduce manual identification effort. With a HART protocol, HART devices can be identified because the HART protocol uses 4-20 mA for communication. Certain types of HART devices, however, can operate at <4 mA for starting up and enabling healthy HART communications. Furthermore, most of the smart input HART devices require a minimum of >22 mA for energizing such a device and to develop and sustain healthy HART communications. Also, some safety modules can support all types of field devices on any channel of an I/O module. Any type of field device (e.g., AI or AO or DI or DO) may be connected at the I/O channel terminal of an I/O module. On a safety system, it is not advisable to put >22 mA on a channel for a lengthy time to energize the HART device without knowing the type of device connected on the channel. This may lead to adverse effects while energizing output devices (AO/DO) if they are connected at the I/O terminals. Therefore, there is a need to remotely identify the types of devices connected to each I/O channel associated with an I/O module without physically having to go to the actual location of the field device.

SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for improved industrial process control methods, systems and devices.

It is another aspect of the disclosed embodiments to provide for methods, systems and devices for identifying connected device types on an I/O channel based on current characteristics of connected devices.

The aforementioned aspects and other objectives can now be achieved as described herein. In an embodiment, a method for identifying a type of device connected to I/O (Input/Output) channels of an I/O module, can involve applying a current for a predefined time duration to at least one I/O channel associated with an I/O module; initiating a current readback at a regular interval of time within the predefined time duration; determining values of the current readback for each of a time interval during the predefined time duration; storing the values of the current readback in a memory associated with the I/O module; determining a pattern as a function of the values of the current readback and a sample of time interval for a device connected to the at least one I/O channel; and identifying a type of the device connected to the at least one I/O channel based on a determined pattern of a current sink of the device connected to the at least one I/O channel.

In an embodiment of the method, the device connected to the at least one I/O channel can comprise at least one of: an Analog Input (AI), an Analog Output (AO), a Digital Input (DI), a Digital Output (DO), and at least one smart device among a plurality of smart devices.

In an embodiment of the method, the determined pattern can comprise a waveform of the current sink including a current drop and a current release of the device connected to the at least one I/O channel of the I/O module.

In an embodiment of the method, the waveform of the current sink for each of the device connected to the at least one I/O channel can comprise at least one of AI, AO, DI, and DO. The smart devices among the plurality of smart devices can also be different from one another.

In an embodiment of the method, the determined values can be stored as a plurality of samples to be analyzed.

In an embodiment of the method, the plurality of samples can comprise a relationship between the values of the current readback and a time of the current readback.

In an embodiment, the values of the current readback can correspond to the current sink of the device connected to the at least one I/O channel.

In an embodiment, a system for identifying a type of connected device to I/O channels of an I/O module, can comprise at least one processor and a non-transitory computer-usable medium embodying computer program code, wherein the computer-usable medium is capable of communicating with the at least one processor. The computer program code can include instructions executable by the at least one processor and configured for: applying a current for a predefined time duration to at least one I/O channel associated with an I/O module; initiating a current readback at a regular interval of time within the predefined time duration; determining values of the current readback for each of a time interval during the predefined time duration; storing the values of the current readback in a memory associated with the I/O module; determining a pattern as a function of the values of the current readback and a sample of time interval for a device connected to the at least one I/O channel; and identifying a type of the device connected to the at least one I/O channel based on a determined pattern of a current sink of the device connected to the at least one I/O channel.

In an embodiment of the system, the device connected to the at least one I/O channel can comprise at least one of: an Analog Input (AI), an Analog Output (AO), a Digital Input (DI), a Digital Output (DO), and a smart device among a plurality of smart devices In an embodiment of the system, the determined pattern can comprise a waveform of the current sink including a current drop and a current release of the device connected to the at least one I/O channel of the I/O module.

In an embodiment of the system, the waveform of the current sink for each of the device connected to the at least one I/O channel can comprise at least one of AI, AO, DI, and DO; and the smart devices among the plurality of smart devices can be different from one another.

In an embodiment of the system, the determined values can be stored as a plurality of samples to be analyzed.

In an embodiment of the system, the plurality of samples can comprise a relationship between the values of the current readback and a time of the current readback.

In an embodiment of the system, the values of the current readback can correspond to the current sink of the device connected to the at least one I/O channel.

In an embodiment, an apparatus, can comprise an I/O (Input/Output) module having at least one I/O channel, and a memory associated with the I/O module. A current can be applied for a predefined time duration to at least one I/O channel associated with an I/O module. A current readback can be initiated at a regular interval of time within the predefined time duration. Additionally, values of the current readback can be determined for each of a time interval during the predefined time duration. The values of the current readback can be stored in the memory associated with the I/O module, and a pattern can be determined as a function of the values of the current readback and a sample of time interval for a device connected to the at least one I/O channel. A type of the device connected to the at least one I/O channel can be identified based on a determined pattern of a current sink of the device connected to the at least one I/O channel.

In embodiment of the apparatus, the device connected to the at least one I/O channel can comprise at least one of: an Analog Input (AI), an Analog Output (AO), a Digital Input (DI), a Digital Output (DO), and a smart device among a plurality of smart devices.

In an embodiment of the apparatus, the determined pattern can comprise a waveform of the current sink including a current drop and a current release of the device connected to the at least one I/O channel of the I/O module.

In an embodiment of the apparatus, the waveform of the current sink for each of the device connected to the at least one I/O channel can comprise at least one of AI, AO, DI, and DO; and the smart devices among the plurality of smart devices can be different from one another.

In an embodiment of the apparatus, the determined values can be stored as a plurality of samples to be analyzed.

In an embodiment of the apparatus, the plurality of samples can comprise a relationship between the values of the current readback and a time of the current readback.

In an embodiment of the apparatus, the values of the current readback can correspond to the current sink of the device connected to the at least one I/O channel.

BRIEF DESCRIPTION OF THE DRAWING

For a more complete understanding of this disclosure, reference is now made to the following description, taken in conjunction with the accompanying drawings, in which.

DETAILED DESCRIPTION

Figure 1:
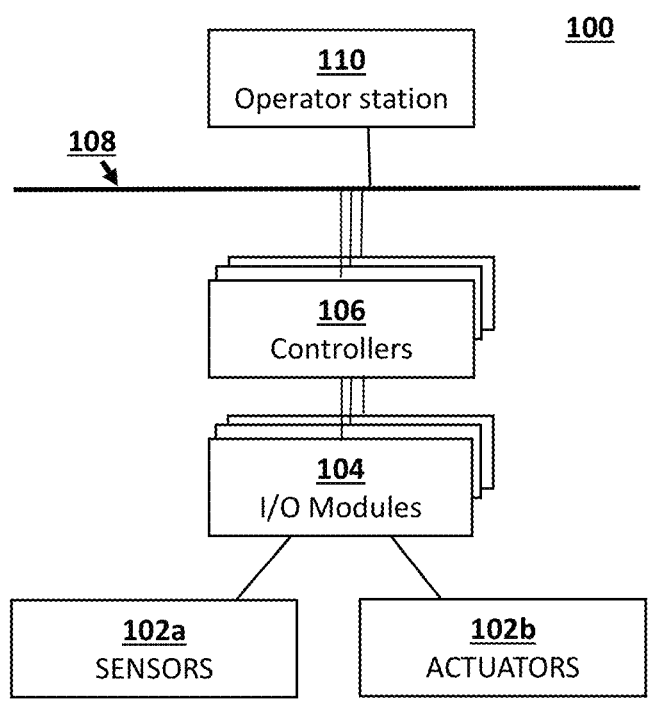
FIG. 1 illustrates a portion of an example industrial process control and automation system, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

It is advantageous to set forth definitions of certain words and phrases used throughout this patent document. The terms "application" and "program" can refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, can encompass both direct and indirect communication. The terms "include" and "comprise," as well as derivatives thereof, can mean inclusion without limitation. The term "or" can be inclusive, meaning and/or.

The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" can mean any device, system, or part thereof that controls at least one operation. A controller may be implemented in hardware or a combination of hardware and software/firmware. The functionality associated with any particular controller may be centralized or distributed, whether locally or remotely. The word "apparatus" may be utilized interchangeably with the word "device".

FIG. 1 through FIG. 4, discussed below, and the related descriptions are provided by way of illustration only and should not be construed in any way to limit the scope of the embodiments. Those skilled in the art will understand that the principles of the embodiments can be implemented in any type of suitably arranged system or apparatus.

FIG. 1 illustrates a portion of an exemplary industrial process control and automation system 100. As shown in FIG. 1, the system 100 can include various components that facilitate production or processing of at least one product or other material. For instance, the system 100 can be used to facilitate control or monitoring of components in one or multiple industrial plants. Each plant represents one or more processing facility (or one or more portions thereof), such as one or more manufacturing facility for producing at least one product or other material. In general, each plant can implement one or more industrial processes and can individually or collectively be referred to as a processing system. A processing system generally can represent any system or portion thereof, which may be configured to process one or more products or other materials or energy in different forms in some select manner In the example shown in FIG. 1, the system 100 can include one or more sensors 102a and one or more actuators 102b. The sensors 102a and actuators 102b can represent components in a processing system that can perform any of a wide variety of functions. For example, the sensors 102a can measure a wide variety of characteristics in the process system, not limited to temperature, pressure, or flow rate. Also, the actuators 102b can alter a wide variety of characteristics in the processing system. Each of the sensors 102a can include any suitable structure for measuring one or more characteristics in a processing system. Each of the actuators 102b can include any suitable structure for operating on or otherwise affecting one or more conditions in a processing system.

At least one input/output (I/O) (sometimes also referred to simply as "IO") module(s) 104 can be coupled to the sensors 102a and actuators 102b. One or more I/O module(s) 104 can facilitate interaction with the sensors 102a, actuators 102b, or other field devices. For example, the I/O module(s) 104 can be used to receive one or more analog inputs (AIs), digital inputs (DIs), digital input sequences of events (DISOEs), or pulse accumulator inputs (PIs), or to provide one or more analog outputs (AOs) or digital outputs (DOs). Each of the I/O module(s) 104 can include any suitable structure(s) for receiving one or more input signals from, or providing one or more output signals to, one or more field devices.

Various types of controllers 106 can be used in the system 100 to perform various functions in order to control one or more industrial process. For example, a first set of controllers 106 can use measurements from one or more sensors 102a to control the operation of one or more actuators 102b. These controllers 106 can interact with the sensors 102a, actuators 102b, and other field devices via the I/O module(s) 104. A second set of controllers 106 can be used to optimize the control logic or other operations performed by the first set of controllers. A third set of controllers 106 may be used to perform additional functions.

Controllers 106 can be arranged hierarchically in a system. For example, different controllers 106 can be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components supporting communications.

Each controller 106 can include any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control (MPC) or other advanced predictive control. As a particular example, each controller 106 can represent a computing device running a real-time operating system, a WINDOWS operating system, or other operating system.

Operator access to, and interaction with, the controllers 106 and other components of the system 100 can occur via various operator stations 110. Each operator station 110 can be used to provide information to an operator and receive information from an operator. For example, each operator station 110 can provide information identifying a current state of an industrial process to an operator, such as values of various process variables and warnings, alarms, or other states associated with the industrial process. Each operator station 110 can also receive information affecting how the industrial process can be controlled, such as by receiving setpoints for process variables controlled by the controllers 106 or other information that can alter or affects how the controllers 106 control the industrial process. Each operator station 110 can include any suitable structure for displaying information to and interacting with an operator.

This represents a brief description of one type of industrial process control and automation system that can be used to manufacture or process one or more materials. Some details regarding industrial process control and automation systems are well-known in the art and are not needed for an understanding of this disclosure. Also, industrial process control and automation systems are highly configurable and can be configured in any suitable manner according to particular needs.

In particular embodiments, the various controllers and operator stations in FIG. 1 can represent computing devices. For example, each of the controllers and operator stations can include one or more processing devices and one or more memories for storing instructions and data used, generated, or collected by the processing device(s). Each of the controllers and operator stations can also include at least one network interface, such as one or more Ethernet interfaces or wireless transceivers.

In process control and automation systems such as the system 100, I/O channels can be used to connect controllers (such as the controller 106) and field devices, which are not limited to those shown in FIG. 1 such as the sensors 102*a* and actuators 102*b*. In general, the I/O module(s) 104 can support I/O channels of various types, including analog inputs (AIs), digital inputs (DIs), digital input sequences of events (DISOEs), pulse accumulator inputs (PIs), analog outputs (AOs), or digital outputs (DOs). Different I/O channel types can be characterized by different inputs, outputs, voltages, currents, and configurations. For example, AI and AO channels are typically of the 4-20 mA type, but they could also include thermocouples and the like.

An I/O channel could have a current output in various configurations, regardless of the I/O type of the field device to which the I/O channel is connected. Often times, the current output can be used to measure a corresponding signal, which can be current readback values. Although FIG. 1 illustrates one example of an industrial process control and automation system, various changes can be made to FIG. 1. For example, the system 100 can include any number of sensors, actuators, I/O modules, controllers, operator stations, networks, IS barriers, and other components. Also, the makeup and arrangement of the system 100 in FIG. 1 is provided for illustration only. Components can be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs.

Figure 2A:
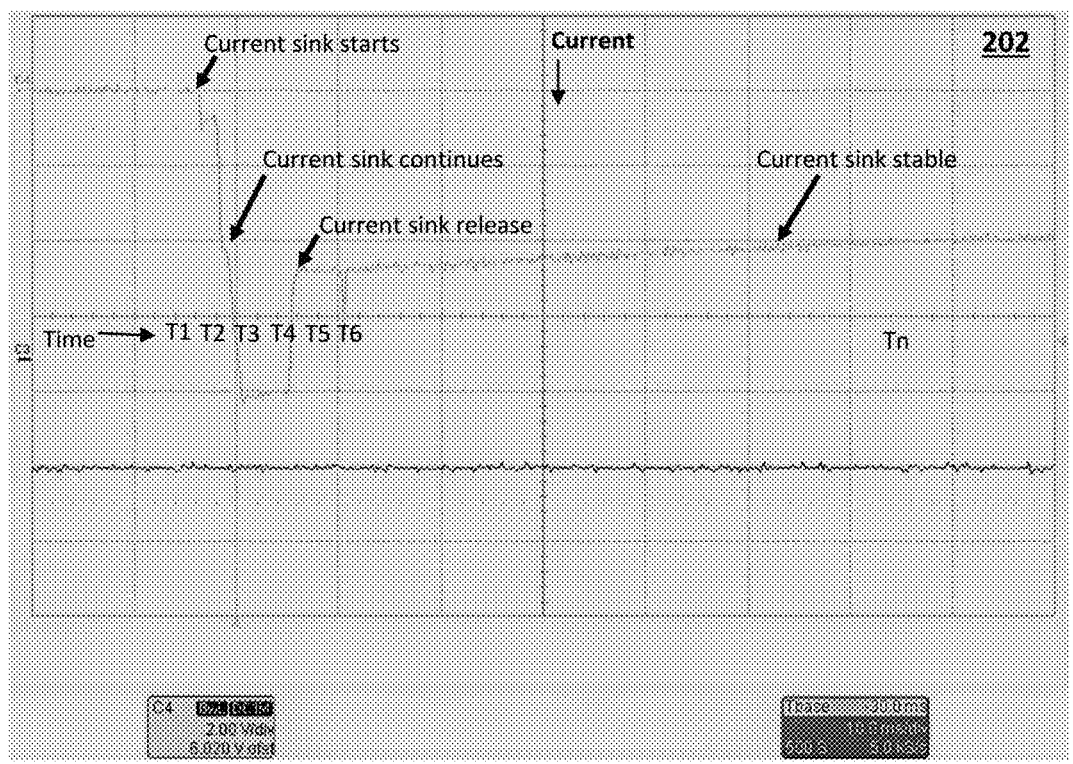
FIG. 2A illustrates a graph depicting data indicative of current characteristics of an Analog Input (AI) device connected to I/O channels, in accordance with an embodiment.

FIG. 2A to FIG. 2D depict sample graphs of current characteristics for different type of devices connected to the I/O channels. FIG. 2A shows a graph 202 that can indicate a pattern of current sink of an Analog Input (AI) device connected to an I/O channel. The graph 202 indicates that current sink starts for a predefined time duration, which can range from 20 msec to 1 sec with current of 25 mA at sample time T1. The connected device conducts after every 5 msec or may be different based on a regular interval of time. Further, at sample time T2 and T3, the current sink can continue for another 3 msec or may be different based on the regular interval of time. Furthermore, at sample times T4, T5, and T6, the current sink can start becoming stable for the rest of the duration of the predefined time duration, which can range from 20 msec to 1 sec for the connected device. In this embodiment, the predefined time duration can be 25 msec. For each recorded sample time (T1 to T6), the current readback value can be measured and the value of current readback stored in the memory associated with the processing device to determine the pattern of the connected device.

With respect to FIG. 2A, it can be noted that sample time can vary to Tn samples within the predefined time duration ranges from 20 msec to 1 sec, which can be based on the configuration of the connected device and the device specific behavior. The processing device can measure and store Tn samples within the predefined time duration. Once all the samples have been recorded and stored in the memory, the processing device can analyze the pattern of the current sink characteristics of the connected device. The determined pattern can be a waveform of current sink including current drop and current release of the device connected to the at least one I/O channel of the I/O module.

As shown in graph 202 of FIG. 2A, the sample Tn can indicate the relationship between the current readback values and the time of the current readback. In an example, the processing device can store the determined pattern of device as Analog Input (AI) type of device in the memory associated with the processing device. The determined pattern can be stored in a persistent storage for future use to identify the type of device connected to the I/O channels. Similarly, the determined pattern can be compared to the patterns stored in the persistent storage to identify the type of the connected device. In an example, the processing device can further identify the type of AI device, which may or may not be a temperature sensor, a $CO_2$ sensor, a pressure sensor, a humidity sensor, a flow sensor, or a potentiometer. In addition, the current readback can function on the basis of the loop current maintained between the I/O channel and the connected device.

In another embodiment, each of the AI devices can include different current characteristics, which may indicate a unique pattern based on the current readback values. Accordingly, the waveforms of the current sink for different AI devices may be different from one another.

Figure 2B:
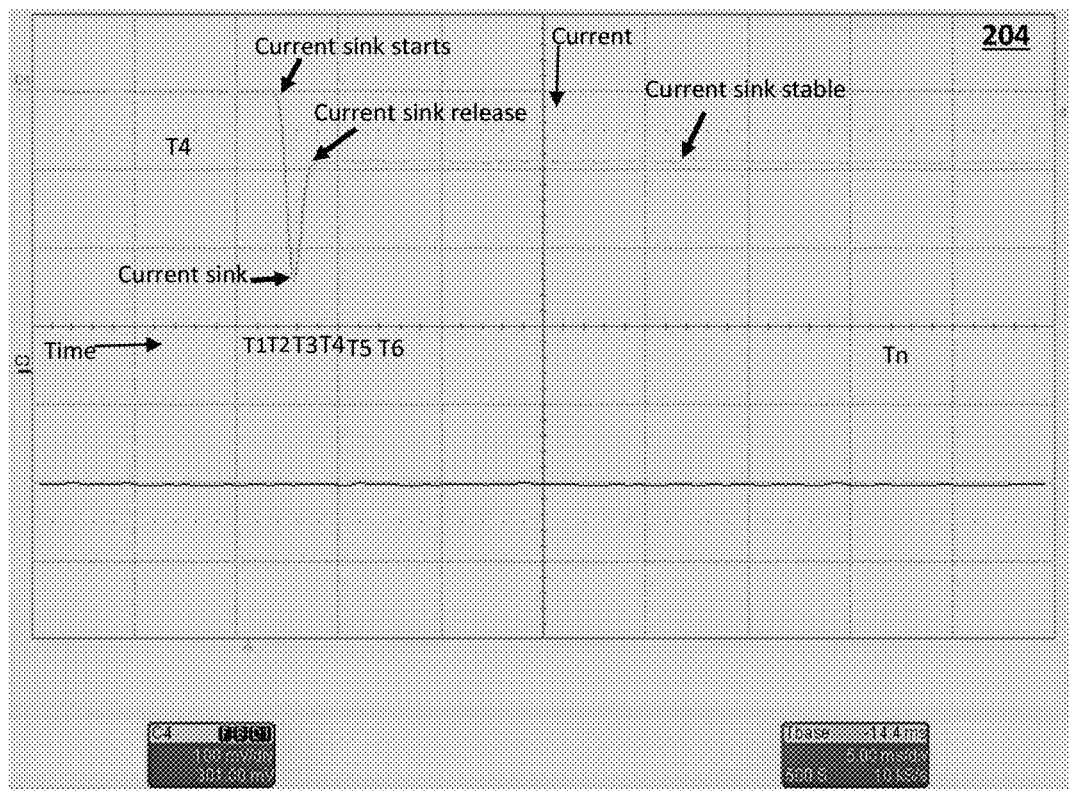
FIG. 2B illustrates a graph depicting data indicative of current characteristics of a Digital Input (DI) device connected to I/O channels, in accordance with an embodiment.

FIG. 2B shows a graph 204 that indicates a pattern of a current sink of a Digital Input (DI) device connected to the I/O channel. The graph 204 shown in FIG. 2B indicates that a current sink may begin for a predefined time duration, which may range from 20 msec to 1 sec with a current of 25 mA at a sample time T1. In this case, the predefined time duration can be 25 msec. The connected device can conduct after every 5 msec or may be different based on a regular interval of time.

Furthermore, as indicated by sample time T2 and sample time T3, the current sink can continue for another 5 msec or may vary based on a regular interval of time, where at the sample time T3, the current may be completely drawn. At a sample time T4, the connected devices can release the current sink, which is shown in the FIG. 2B. Furthermore, as indicated at sample time T5 and sample time T6, the current sinks start becoming stable for the rest of the duration of the predefined time duration. Note that at each recorded sample time (e.g., T1 to T6), the current readback value can be measured and the value of the current readback can be stored in the memory associated with the processing device to determine the pattern of the connected device.

With respect to graph 202 shown in FIG. 2B, it can be noted that the sample time can vary to Tn samples within the predefined time duration ranges from, for example, 20 msec to 1 sec, which may be based on the configuration of the connected device and the device specific behavior. A processing device can measure and store Tn samples within the predefined time duration. Once all the samples have been recorded and stored in the memory, the processing device can be configured to analyze the pattern of the current sink characteristics of the connected device. The determined pattern can be a waveform of a current sink including a current drop and a current release of the device connected to the at least one I/O channel of the I/O module.

As shown in FIG. 2B, the sample Tn can be a relationship between the current readback values and the time of the current readback. In an example, the processing device can store the determined pattern of the device as a Digital Input (DI) type of device in a memory associated with the processing device. The determined pattern can be stored in a persistent storage for a future use of identifying the type of device that can be connected to the I/O channels. Similarly, the identified pattern can be compared to the patterns stored in the persistent storage to identify the type of device connected. In an example, the processing device can further identify the type of DI device, which may or may not be limited to valves, switches, relay contacts, circuit breakers, Fans, Lights, or horns. Each of the DI devices can conduct at a rated current where the current readback functions on the basis of the loop current maintained between the I/O channel and the connected device.

Figure 2C:
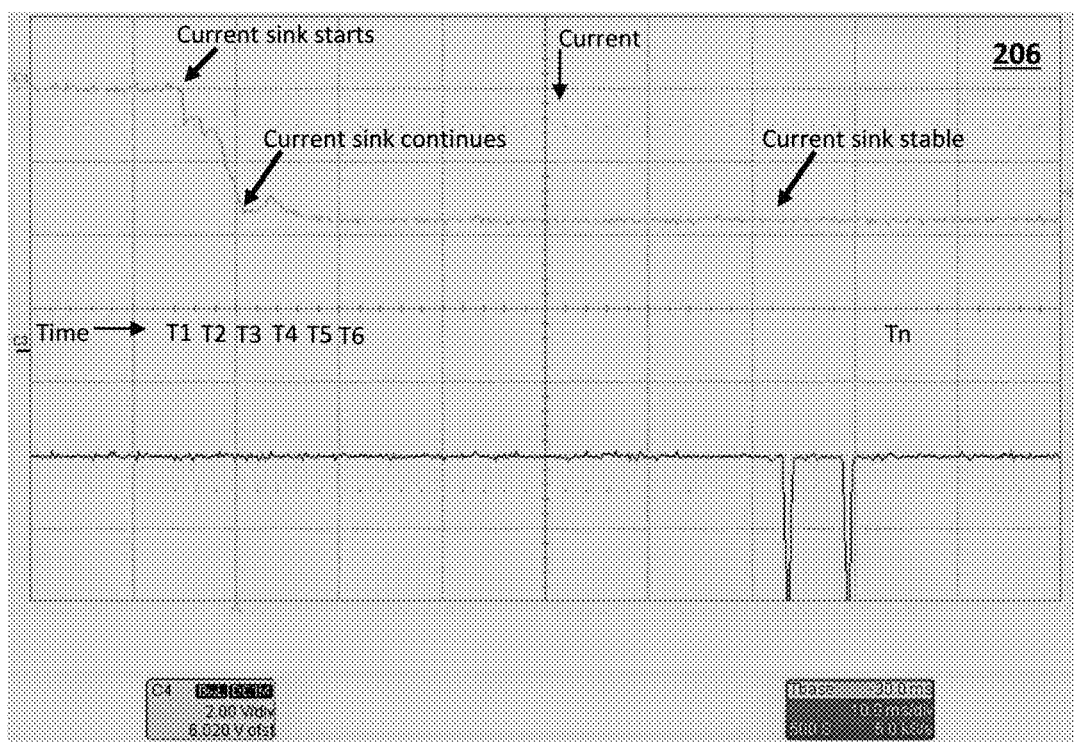
FIG. 2C illustrates a graph depicting data indicative of current characteristics of an Analog Output (AO) device connected to I/O channels, in accordance with an embodiment.

In another embodiment, each of the DI devices may possess different current characteristics, which can indicate a unique pattern based on the current readback values. Note that the waveforms of the current sink for different DI devices may be different from each other FIG. 2C illustrates a graph 206 depicting a pattern of the current sink of an Analog Output (AO) device connected to the I/O channel, in accordance with an embodiment. The graph 206 depicted in FIG. 2C indicates that the current sink can start for a predefined time duration, which can range from 20 msec to 1 sec with a current of 25 mA at a sample time T1. The predefined time duration can be 25 msec. Furthermore, at the sample time T2 and the sample time T3, the current sink can continue for another 5 msec or may vary based on the regular interval of time, where at the sample time T3, the current can be completely drawn.

At the sample time T4, the connected devices can release the current sinks as shown in FIG. 2C. Furthermore, at the sample time T5 and the sample time T6, the current sinks can start becoming stable for the remainder of the duration of the predefined time duration. For each recorded sample time (e.g., T1 to T6), the current readback value can be measured and the value of the current readback stored in the memory associated with the processing device can be used to determine the pattern of the connected device.

As shown in FIG. 2C, the sample time can vary to Tn samples within the predefined time duration ranges from, for example, 20 msec to 1 sec, which can be based on the configuration of the connected device and the device specific behavior. The processing device can measure and store Tn samples within the predefined time duration. Once all the samples have been recorded and stored in the memory, the processing device can be configured to analyze the pattern of the current sink characteristics of the connected device using the algorithm. The determined pattern can be a waveform of current sink including the current drop and the current release of the device connected to the at least one I/O channel of the I/O module.

As shown in the FIG. 2C, the sample Tn can be the relationship between the current readback values and time of the current readback. In an example, the processing device can store the determined pattern of device as Analog Output (AO) type of device in the memory associated with the processing device. The determined pattern can be stored in a persistent storage for future use to identify the type of device connected to the I/O channels. Similarly, the identified pattern can be compared to the patterns stored in the persistent storage to identify the type of device connected. In an example, the processing device using the algorithm can further identify the type of AO device that is not limited to a display, a speaker, a public address system, lights, an indicator or a printer. Each of the AO devices can conduct at the rated current where the current readback functions on the basis of loop current maintained between the I/O channel and the connected device.

In another embodiment, each of the AO devices may have different current characteristics, which can indicate a unique pattern based on the current readback values. Accordingly, the waveforms of current sink for different AO devices may be different from one another.

Figure 2D:
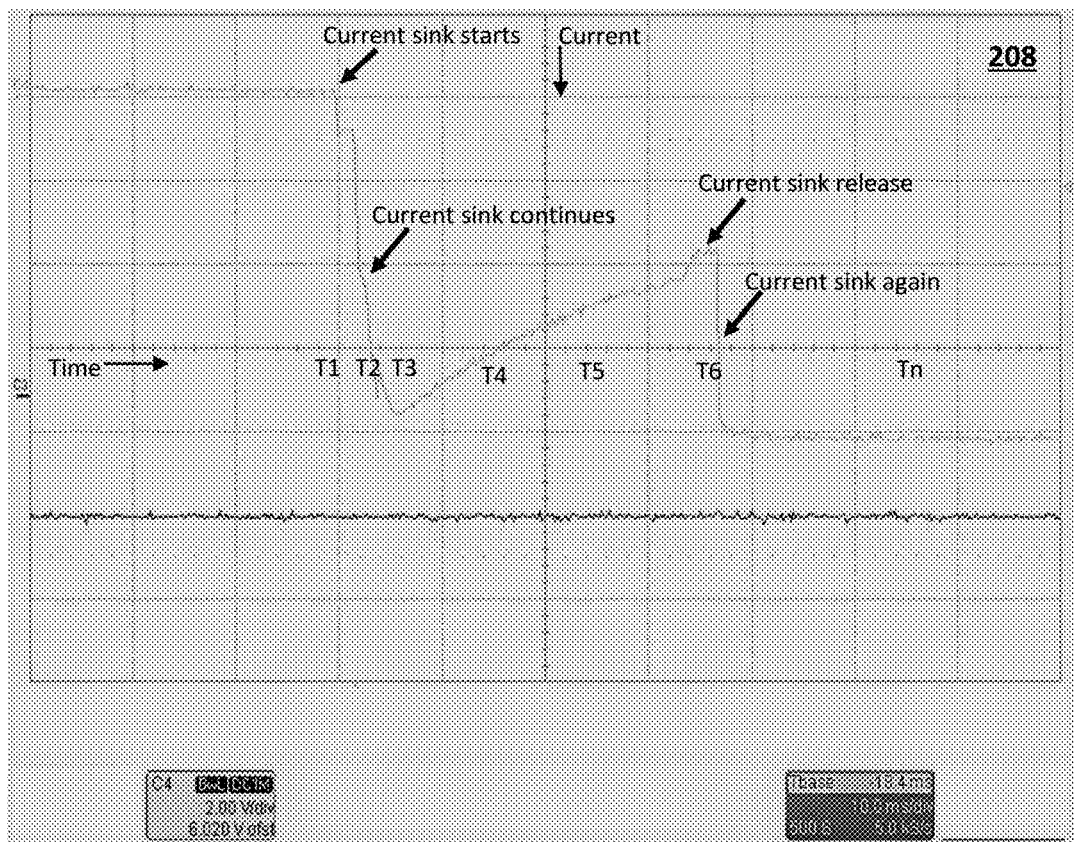
FIG. 2D illustrates a graph depicting data indicative of current characteristics of a Digital Output (DO) device connected to I/O channels in accordance with an embodiment.

FIG. 2D illustrates a graph 208 that indicates a pattern of current sink of a Digital Output (DO) device connected to the I/O channel, in accordance with an embodiment. The graph 208 indicates that the current sink starts for a predefined time duration, which can range from 20 msec to 1 sec with a current of 25 mA at a sample time T1. In an embodiment, the predefined time duration may be 25 msec. Furthermore, at a sample time T2 and a sample time T3, the current sink can continue for another 5 msec or may vary based on the regular interval of time, where at the sample time T3, the current is completely drawn. At the sample time T4 and the sample time T5, however, the connected devices can begin releasing some current, which is shown in FIG. 2D. Furthermore, at a sample time T6 in another 5 msec duration, the current sinks again and completely draws the current again. For each recorded sample time (e.g., T1 to T6), the current readback value can be measured and the value of current readback can be stored in the memory associated with the processing device to determine the pattern of the connected device.

As shown in FIG. 2D, the sample time may vary to Tn samples within predefined time duration ranges of, for example, 20 msec to 1 sec, which can be based on the configuration of the connected device and the device specific behavior. The processing device can measure and store Tn samples within the predefined time duration. Once all the samples have been recorded and stored in the memory, the processing device can be configured to analyze the pattern of the current sink characteristics of the connected device using the algorithm. The determined pattern can be a waveform of current sink including a current drop and the current release of the device connected to the at least one I/O channel of the I/O module.

As shown in FIG. 2D, the sample Tn can be a relationship between the current readback values and the time of the current readback. In an example, the processing device can store the determined pattern of the device as a Digital Output (DO) type of device in the memory associated with the processing device. The determined pattern can be stored in a persistent storage for future use to identify the type of device connected to the I/O channels. Similarly, the identified pattern can be compared to the patterns stored in the persistent storage to identify the type of device connected.

As shown in the FIG. 2D, the DO device may be a sound alarming device or a light alarming device, which may conduct or sink all current and release most of the current in a continuous cycle. Different DO devices, however, may possess different current characteristics, which can provide a distinct pattern based on the current characteristics of the DO device. In yet another embodiment, the processing device using the algorithm may further identify the type of DO device, which may not be limited to alarms, fans, lights, horns, relay, motor starter, or solenoids. Each Digital Input device may conduct at the rated current where the current readback functions on the basis of a loop current maintained between the I/O channel and the connected device.

In another embodiment, each DO device may have different current characteristics, which can indicate a unique pattern based on the current readback values. Accordingly, the waveforms of the current sink for different DO devices may be different from one another.

Figure 3:
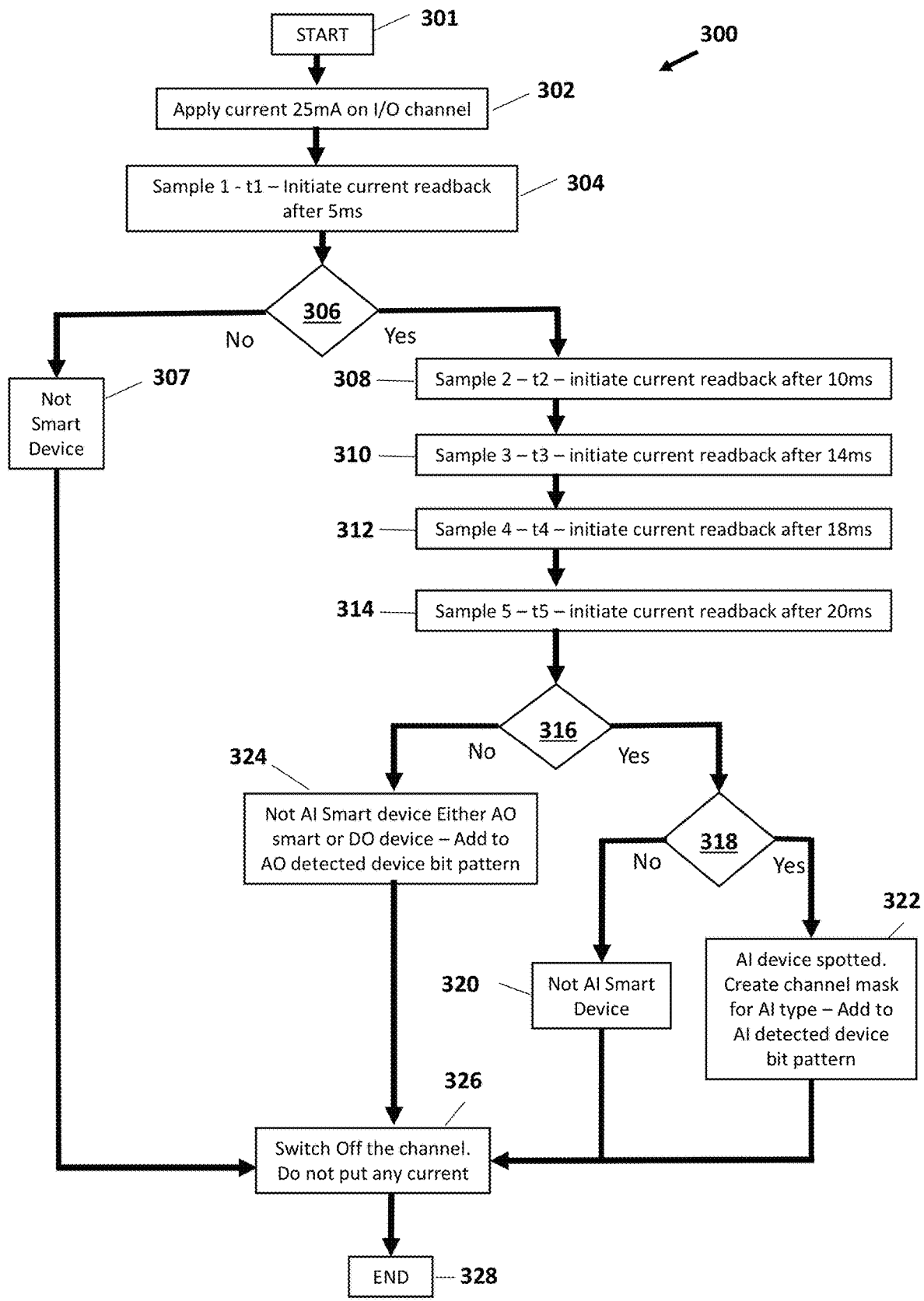
FIG. 3 illustrates a flow chart of operations depicting logical operational steps of a method that can be implemented to identify a device type that is connected to an I/O channel based on current characteristics, in accordance with an embodiment.

FIG. 3 illustrates a flow chart of operations depicting logical operational steps of a method 300 that can be implemented to identify a device type that is connected to an I/O channel based on current characteristics, in accordance with an embodiment. As shown at block 301, the process can be initiated to identify the type of device connected to an I/O channel of an I/O module. As depicted next at block 302, a 25 mA current can be applied to at least one channel of the I/O module. Next, as illustrated at block 304, a step or operation can be implemented in which the current readback can be initiated for a regular interval of time at a sample time T1 and values of the current readback can be stored as a sample 1 in a memory device associated with the I/O module. The regular interval of time can vary between, for example, 1 msec to 5 msec. In some embodiments, the regular interval of time may be 5 msec, where the current readback can be initiated after 5 msec at sample time T1. The regular interval of time, however, may be different based on the configuration and specific device behavior. The processing device can configure, analyze and store Tn samples within the predefined time interval using the algorithm.

Next, as shown at decision block 306, a test can be implemented to determine if the current readback is between 23 mA to 35 mA. If the current readback is not found to be between 23 mA and 35 mA, the connected (and unidentified) device connected can be designated as a non-SMART device, as shown at block 307. Assuming, however, that the current readback is found to be between 23 mA to 35 mA, the operations shown at block 308, block 310, block 312, and block 312 can be then implemented. That is, the current readback can be initiated as depicted at block 308 305 to block 314 at a regular interval of time from sample time T2 to T5 and the values of the current readback can be stored each time from sample time T2 to T5 in the memory device as sample 2-5, respectively. The regular interval of time can vary between 1 msec to 5 msec. The regular interval of time can vary for every sample time T2-T5 based on the configuration of the algorithm in the processing device.

Therefore, as depicted at block 308, the current readback can be initiated at sample time T2 at 10 msec where the regular interval of time can be 5 msec and the values of the current readback can be stored at sample time T2 as a sample 2. Next, as shown at block 310, the current readback can be initiated at sample time T3 at 14 msec where the regular interval of time is 4 msec and the values of the current readback can be stored at sample time T3 as a sample 3.

As depicted thereafter at block 312, the current readback can be initiated at sample time T4 at 18 msec where the regular interval of time is 4 msec and the values of the current readback can be stored at sample time T4 as a sample 4. Next, as depicted at block 314, the current readback can be initiated at sample time T5 at 20 msec where the regular interval of time can be 2 msec and the values of the current readback can be stored at sample time T5 as a sample 5.

Following processing of the operation shown at block 314, a test can be performed, as shown at decision block 316, to check if the current readback is at 23 mA to 25 mA in all samples t2 to t4. The regular interval of time can vary while the current readback values can be measured based on the configuration of the algorithm.

If it is determined that the current readback is not at or between 23 mA to 25 mA in all samples t2 to t5, then the operation shown at block 324 can be implemented. That is, as depicted at blocks 316 and 324, the current readback can be checked to determine if it is between at 23 mA and 25 mA in all the samples at sample time (T2-T5). In case the current readback is between 23 mA and 25 mA, the unidentified device connected can be identified as at least one of analog input (AI) SMART device or digital output device. The device can be an analog output (AO) Smart device or an digital output (DO) device If the current readback is not between at 23 mA and 25 mA in all samples at the sample time (T2-T5), as shown at decision block 318, the current readback can be checked to determine if it is between at 1 mA to 2 mA. In case the current readback is not between 1 mA to 2 mA, the unidentified device that is connected can be determined not to be an AI smart device, as shown at block 320. In case the current readback is between 1 mA to 2 mA, however, the unidentified device connected can be identified as an AI smart device, as depicted at block 322, adding the device in an AI detected device bit pattern, which may be a pattern of current sink of the device connected to the I/O channel of the I/O module. Following processing of the operations shown at block 307, block 324, block 320, and block 322, the channel can be switched off (i.e., "do not put any current") and the process can then end, as shown at block 328.

Figure 4:
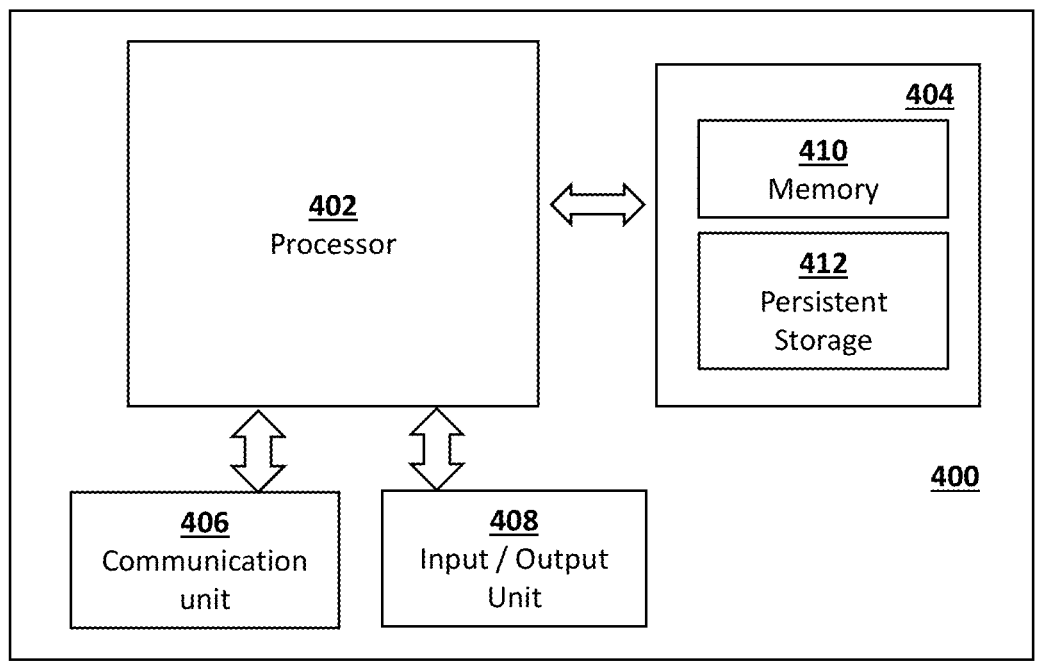
FIG. 4 illustrates an example functional architecture of a system that can identify a type of device connected to an I/O module, in accordance with an embodiment.

FIG. 4 illustrates an example system 400 that can support an architecture for identifying the type of the connected device on an I/O channel based on current characteristics, in accordance with an embodiment. The system 400 shown in FIG. 4 can include at least one processor 402, at least one storage device 404, at least one communications unit 406, and at least one input/output ("I/O") unit 408. The storage device 404 can include a memory 410 and persistent storage 412.

Each processor 402 can execute instructions and can be loaded into a memory 410. For example, the instructions can implement various functions described herein for using the architecture to identify the type of the connected device. Examples of such instructions include the various steps or operations shown in the blocks in FIG. 3. Each processor such as the processor 402 can denote any suitable processing device, including one or more microprocessors, microcontrollers, digital signal processors, application specific integrated circuits ("ASICs"), field programmable gate arrays ("FPGAs"), or discrete circuitry.

The memory 410 and the persistent storage 412 are examples of storage devices, which can represent any structure(s) capable of storing and facilitating retrieval of information including data, program code, and/or other suitable information on a temporary or permanent basis. The memory 410 can represent a random-access memory or any other suitable volatile or non-volatile storage device(s). The persistent storage 412 can contain one or more components or devices supporting longer-term storage of data including a read only memory, hard drive, flash memory, or optical disc.

The communications unit 406 can support communications with other systems or devices. For example, the communications unit 406 can include at least one network interface card or wireless transceiver facilitating communications over at least one wired or wireless network. The communications unit 406 can support communications through any suitable physical or wireless communication link(s).

The I/O unit 408 can allow for input and output of data. For example, the I/O unit 108 can provide a connection for user input through a keyboard, mouse, keypad, touchscreen, or other suitable input device. The I/O unit 408 can also send output to a display, printer, or other suitable output device.

In an embodiment, the processing device 402 using an algorithm stored in the memory 410 can analyze the current sink characteristics of the connected device(s) during the predefined time interval and can determine values of the current readback for each of the time intervals during the predetermined time duration. The determined values can be stored as a plurality of samples where the plurality of samples can be a relationship between the values of the current readback and the time of the current readback, which is also shown in the FIG. 2A to FIG. 2D.

The values of the current readback can correspond to the current sink of the connected device. Each of the connected devices can possess different current sink capabilities. Therefore, the determined values for each of the connected devices can provide a waveform of current sink including a current drop and a current release of the device connected. The waveform of current sink can be different for each device connected. Accordingly, the waveforms of current sink for each connected device can include AI, AO, DI, DO and the SMART devices may be different from each other. The processing device 402 can further analyze the stored values of the current readback and determine a pattern as a function of the current readback values and the sample of time interval for the device connected to the I/O channels. Accordingly, the processing device 402 using the processes identified herein can identify the type of the device connected to the I/O channel based on the determined pattern of the current sink of the connected devices.

It will be appreciated that variations of the above-disclosed embodiments and examples and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for identifying a type of a device connected to I/O (Input/Output) channels of an I/O module in an industrial process control and automation system, implemented using at least one processing device, the method comprising:

electrically applying a current for a predefined time duration to at least one I/O channel among the I/O channels of the I/O module of the industrial process control and automation system, wherein each I/O channel among the I/O channels is characterized by different inputs, outputs, voltages, currents, and configurations corresponding to the at least one I/O channel;

electrically initiating a current readback from the at least one I/O channel at a regular interval of time within the predefined time duration;

electrically operating the current readback based on a loop current maintained between the at least one I/O channel and the device connected to the at least one I/O channel;

electrically determining values of the current readback for each of a time interval during the predefined time duration;

storing the values of the current readback in a memory associated with the I/O module;

electrically determining a pattern as a function of the values of the current readback and a sample of the time interval for the device connected to the at least one I/O channel, the device comprising at least one of: a sensor and an actuator of the industrial process control and automation system;

electrically identifying the type of the device connected to the at least one I/O channel based on the determined pattern of a current sink of the device connected to the at least one I/O channel in the industrial process control and automation system, wherein the determined pattern comprises a waveform of the current sink including a current drop and a current release of the device connected to the at least one I/O channel, wherein the identified type of the device comprises a smart device when a range of the current readback associated with the device falls in at least one range during a test sequence within the predefined time duration, the test sequence including:

a first test for a first range between 23 mA to 35 mA in the at least one range, a second test for a second range between 23 mA to 25 mA in the at least one range, and a third test for a third range between 1 mA to 2 mA in the at least one range;

adding the determined pattern of the identified type of the device in a device bit pattern stored in a persistent storage, wherein the device bit pattern, included in the persistent storage, comprises a plurality of patterns of the current sink of the device connected to the at least one I/O channel in the industrial process control and automation system, for future use to identify the type of the device during run time; and electrically switching off the current applied to the at least one I/O channel associated with the I/O module of the industrial process control and automation system after the addition of the determined pattern of the identified type of the device in the device bit pattern.

2. The method of claim 1, wherein the device connected to the at least one I/O channel further comprises at least one of:
  an Analog Input (AI);
  an Analog Output (AO);
  a Digital Input (DI);
  a Digital Output (DO); and
  a smart device among a plurality of smart devices.

3. The method of claim 2, wherein the waveform of the current sink for the device connected to the at least one I/O channel comprises at least one of the AI, the AO, the DI, and the DO, and wherein smart devices among the plurality of smart devices are different from one another.

4. The method of claim 1, wherein the determined values are stored as a plurality of samples to be analyzed.

5. The method of claim 4, wherein the plurality of samples comprises a relationship between the values of the current readback and a time of the current readback.

6. The method of claim 1, wherein identifying the type of the device further comprises identifying the type of device as being a smart device or a non-smart device, wherein the values of the current readback correspond to the current sink of the device connected to the at least one I/O channel.

7. A system for identifying a type of a device connected to (Input/Output) I/O channels of an I/O module in an industrial process control and automation system, the system comprising:
  at least one processor; and
  a non-transitory computer-usable medium embodying computer program code, wherein the computer-usable medium communicates with the at least one processor, the computer program code comprising instructions executable by the at least one processor and configured for:
    electrically applying a current for a predefined time duration to at least one I/O channel among the I/O channels of the I/O module of the industrial process control and automation system, wherein each I/O channel among the I/O channels is characterized by different inputs, outputs, voltages, currents, and configurations corresponding to the at least one I/O channel;
    electrically initiating a current readback from the at least one I/O channel at a regular interval of time within the predefined time duration;
    electrically operating the current readback based on a loop current maintained between the at least one I/O channel and the device connected to the at least one I/O channel;
    electrically determining values of the current readback for each of a time interval during the predefined time duration;
    storing the values of the current readback in a memory associated with the I/O module;
    electrically determining a pattern as a function of the values of the current readback and a sample of the time interval for the device connected to the at least one I/O channel, the device comprising at least one of: a sensor and an actuator of the industrial process control and automation system;
    electrically identifying the type of the device connected to the at least one I/O channel based on the determined pattern of a current sink of the device connected to the at least one I/O channel in the industrial process control and automation system, wherein the determined pattern comprises a waveform of the current sink including a current drop and a current release of the device connected to the at least one I/O channel, wherein the identified type of the device comprises a smart device when a range of the current readback associated with the device falls in at least one range during a test sequence within the predefined time duration, the test sequence including:
      a first test for a first range between 23 mA to 35 mA in the at least one range,
      a second test for a second range between 23 mA to 25 mA in the at least one range, and
      a third test for a third range between 1 mA to 2 mA in the at least one range;
    adding the determined pattern of the identified type of the device in a device bit pattern stored in a persistent storage, wherein the device bit pattern, included in the persistent storage, comprises a plurality of patterns of the current sink of the device connected to the at least one I/O channel in the industrial process control and automation system, for future use to identify the type of the device during run time; and
    electrically switching off the current applied to the at least one I/O channel associated with the I/O module of the industrial process control and automation system after the addition of the determined pattern of the identified type of the device in the device bit pattern.

8. The system of claim 7, wherein the waveform of the current sink for the device connected to the at least one I/O channel comprises at least one of AI, AO, DI, and DO, and wherein smart devices among a plurality of smart devices are different from one another.

9. The system of claim 7, wherein the determined values are stored as a plurality of samples to be analyzed.

10. The system of claim 9, wherein the plurality of samples comprises a relationship between the values of the current readback and a time of the current readback.

11. The system of claim 7, wherein the values of the current readback correspond to the current sink of the device connected to the at least one I/O channel and wherein type of device is identified as comprising a smart device or a non-smart device.

12. An apparatus, comprising:
  an I/O (Input/Output) module having at least one processing device, at least one I/O channel, and a memory associated with the I/O module of an industrial process control and automation system, wherein the at least one processing device is configured to:
    electrically apply a current for a predefined time duration to the at least one I/O channel among the I/O channels associated with the I/O module of the industrial process control and automation system, wherein each I/O channel among the I/O channels is characterized by different inputs, outputs, voltages, currents, and configurations corresponding to the at least one I/O channel;
    electrically initiate a current readback from the at least one I/O channel at a regular interval of time within the predefined time duration;
    electrically operate the current readback based on a loop current maintained between the at least one I/O channel and a device connected to the at least one I/O channel;
    electrically determine values of the current readback for each of a time interval during the predefined time duration;
    store the values of the current readback in the memory associated with the I/O module;

electrically determine a pattern as a function of the values of the current readback and a sample of the time interval for the device connected to the at least one I/O channel, the device comprising at least one of: a sensor and an actuator of the industrial process control and automation system;

electrically identify a type of the device connected to the at least one I/O channel based on the determined pattern of a current sink of the device connected to the at least one I/O channel in the industrial process control and automation system, wherein the determined pattern comprises a waveform of the current sink including a current drop and a current release of the device connected to the at least one I/O channel, wherein the identified type of the device comprises a smart device when a range of the current readback associated with the device falls in at least one range during a test sequence within the predefined time duration, the test sequence including:
a first test for a first range between 23 mA to 35 mA in the at least one range,
a second test for a second range between 23 mA to 25 mA in the at least one range, and
a third test for a third range between 1 mA to 2 mA in the at least one range;

add the determined pattern of the identified type of the device in a device bit pattern stored in a persistent storage, wherein the device bit pattern, included in the persistent storage, comprises a plurality of patterns of the current sink of the device connected to the at least one I/O channel in the industrial process control and automation system, for future use to identify the type of the device during run time; and electrically switch off the current applied to the at least one I/O channel associated with the I/O module of the industrial process control and automation system after the addition of the determined pattern of the identified type of the device in the device bit pattern.

13. The apparatus of claim 12, wherein the device connected to the at least one I/O channel comprises at least one of:
an Analog Input (AI);
an Analog Output (AO);
a Digital Input (DI);
a Digital Output (DO); and
a smart device among a plurality of smart devices.

14. The apparatus of claim 13, wherein the waveform of the current sink for each of the device connected to the at least one I/O channel comprises at least one of the AI, the AO, the DI, and the DO, and wherein smart devices among the plurality of smart devices are different from one another.

15. The apparatus of claim 12, wherein the determined values are stored as a plurality of samples to be analyzed.

16. The apparatus of claim 15, wherein the plurality of samples comprises a relationship between the values of the current readback and a time of the current readback.

17. The apparatus of claim 12, wherein the values of the current readback correspond to the current sink of the device connected to the at least one I/O channel and wherein the type of device is identified as comprising a smart device or a non-smart device.

* * * * *